(12) United States Patent
Schleicher et al.

(10) Patent No.: US 7,597,795 B2
(45) Date of Patent: Oct. 6, 2009

(54) PROCESS FOR MAKING LUBE OIL BASESTOCKS

(75) Inventors: Gary P. Schleicher, Baton Rouge, LA (US); Kenneth L. Riley, Baton Rouge, LA (US); Elizabeth Stavens, Seabrook, TX (US); Sylvain Hantzer, Prairieville, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 129 days.

(21) Appl. No.: 10/949,482

(22) Filed: Sep. 24, 2004

(65) Prior Publication Data

US 2005/0109673 A1  May 26, 2005

Related U.S. Application Data

(60) Provisional application No. 60/518,739, filed on Nov. 10, 2003, provisional application No. 60/608,466, filed on Sep. 9, 2004.

(51) Int. Cl.
C10G 73/38 (2006.01)
C10G 67/04 (2006.01)
C10G 65/02 (2006.01)

(52) U.S. Cl. .............. 208/87; 208/18; 208/27; 208/57; 208/58; 208/71; 208/72; 208/88; 208/89; 208/95; 208/97

(58) Field of Classification Search .......... 208/18, 208/27, 87, 89, 57, 58, 71, 72, 88, 95, 97
See application file for complete search history.

(56) References Cited

U.S. PATENT DOCUMENTS

| | | | |
|---|---|---|---|
| 4,019,976 A | 4/1977 | Cosyns et al. | |
| 4,145,276 A | 3/1979 | Cosyns et al. | |
| 4,181,602 A | 1/1980 | Quick et al. | |
| 4,188,284 A | 2/1980 | Quick et al. | |
| 4,191,635 A | 3/1980 | Quick et al. | |
| 4,211,634 A | 7/1980 | Bertolacini et al. | |
| 4,225,421 A | 9/1980 | Hensley et al. | |
| 4,397,827 A | 8/1983 | Chu | 423/705 |
| 4,431,525 A | 2/1984 | Hensley et al. | |
| 4,440,871 A | 4/1984 | Lok et al. | 502/214 |
| 4,572,778 A | 2/1986 | Ward | |
| 4,585,747 A | 4/1986 | Valyocsik | 502/62 |
| 4,642,179 A | 2/1987 | Morales et al. | |
| 4,686,030 A | 8/1987 | Ward | |

(Continued)

FOREIGN PATENT DOCUMENTS

WO    WO 99/41327    8/1999

(Continued)

OTHER PUBLICATIONS

U.S. Appl. No. 10/949,483, Co-pending Application.

(Continued)

*Primary Examiner*—Glenn Caldarola
*Assistant Examiner*—Prem C. Singh
(74) *Attorney, Agent, or Firm*—Robert A. Migliorini (57) ABSTRACT

A process for producing lube oil basestocks involving solvent extracting a waxy feed to produce at least a lube oil boiling range raffinate, hydrotreating the lube oil raffinate to produce a hydrotreated raffinate, and dewaxing the hydrotreated raffinate.

50 Claims, 1 Drawing Sheet

U.S. PATENT DOCUMENTS

| | | | |
|---|---|---|---|
| 4,695,365 A | 9/1987 | Ackelson et al. | |
| 4,776,945 A | 10/1988 | Washecheck et al. | |
| 4,855,037 A | 8/1989 | Murakami et al. | |
| 4,900,707 A | 2/1990 | Cody et al. | 502/230 |
| 4,902,404 A | 2/1990 | Ho | 208/57 |
| 4,925,554 A | 5/1990 | Sato et al. | |
| 4,975,177 A | 12/1990 | Garwood et al. | 208/27 |
| 5,068,025 A | 11/1991 | Bhan | |
| 5,075,269 A | 12/1991 | Degnan et al. | 502/77 |
| 5,100,855 A | 3/1992 | Clark et al. | |
| 5,116,484 A | 5/1992 | Smegal | |
| 5,232,578 A | 8/1993 | Gillespie | 208/59 |
| 5,246,566 A | 9/1993 | Miller | 208/27 |
| 5,282,958 A | 2/1994 | Santilli et al. | 208/111.15 |
| 5,474,670 A | 12/1995 | Daage et al. | 208/210 |
| 5,624,547 A | 4/1997 | Sudhakar et al. | |
| 5,888,380 A | 3/1999 | Fujita et al. | |
| 5,976,354 A | 11/1999 | Powers et al. | |
| 6,096,189 A * | 8/2000 | Cody et al. | 208/87 |
| 6,162,350 A | 12/2000 | Soled et al. | |
| 6,290,841 B1 | 9/2001 | Gabrielov et al. | 208/213 |
| 6,294,077 B1 | 9/2001 | Dougherty et al. | 208/27 |
| 6,303,534 B1 | 10/2001 | Strohmaier et al. | 502/214 |
| 6,310,265 B1 | 10/2001 | Chester et al. | 585/739 |
| 6,383,366 B1 | 5/2002 | Riley et al. | 208/137 |
| 6,582,590 B1 | 6/2003 | Riley et al. | 208/210 |
| 6,620,313 B1 | 9/2003 | Demmin et al. | 208/112 |
| 2002/0040863 A1 * | 4/2002 | Cody et al. | 208/18 |

FOREIGN PATENT DOCUMENTS

| | | |
|---|---|---|
| WO | WO 00/42119 | 7/2000 |
| WO | WO 00/42121 | 7/2000 |
| WO | WO 00/42125 | 7/2000 |
| WO | WO 00/42129 | 7/2000 |
| WO | WO 00/42131 | 7/2000 |
| WO | WO 00/78677 | 12/2000 |
| WO | WO 02/42207 | 5/2002 |

OTHER PUBLICATIONS

U.S. Appl. No. 10/949,513, Co-pending Application.

* cited by examiner

FIGURE

PROCESS FOR MAKING LUBE OIL BASESTOCKS

CROSS-REFERENCE TO RELATED APPLICATIONS

This application claims benefit of U.S. Provisional Patent Application Ser. No. 60/518,739 filed Nov. 10, 2003 and Ser. No. 60/608,466 filed Sep. 9, 2004.

FIELD OF THE INVENTION

The present invention relates to a process for preparing lubricating oil basestocks from lube oil boiling range feedstreams that meet American Petroleum Institute Group II specifications. More particularly, the present invention is directed at a process wherein a wax containing feedstock is solvent extracted to produce at least a lube oil boiling range raffinate, the lube oil raffinate is hydrotreated to produce a hydrotreated raffinate, and the hydrotreated raffinate is dewaxed.

BACKGROUND OF THE INVENTION

It has long been recognized that one of the most valuable products generated through the refining of crude mineral oils is lubricating oils. It is common practice to recover lubricating oil basestocks by solvent extracting, with a selective solvent, undesirable components such as sulfur compounds, oxygenated compounds, and aromatics from straight distillates. However, with the decline in the availability of paraffinic base crudes, and a corresponding increase in the proportion of naphthenic and asphaltic base crudes, it is becoming increasingly difficult to meet the demand for lubricating oil basestocks, or base oils. For example, American Petroleum Institute (API) requirements for Group II basestocks include a saturates content of at least 90%, a sulfur content of 0.03 wt. % or less and a viscosity index (VI) between 80 and 120. Thus, there is a trend in the lube oil market to use Group II basestocks instead of Group I basestocks in order to meet the demand for higher quality basestocks that provide for increased fuel economy, reduced emissions, etc.

Conventional techniques for preparing basestocks such as hydrocracking or solvent extraction require severe operating conditions such as high pressure and temperature or high solvent:oil ratios and high extraction temperatures to reach these higher basestock qualities. Either alternative involves expensive operating conditions and low yields.

Hydrocracking has been combined with hydrotreating as a preliminary step. However, this combination also results in decreased yields of lubricating oils due to the conversion to distillates that typically accompany the hydrocracking process.

Thus, as the demand for quality lube oil basestock continues to increase, the search for new and different processes, catalysts, and catalyst systems that exhibit improved activity, increased yields, selectivity and/or longevity is a continuous, ongoing exercise. Therefore, there is a need in the lube oil market to provide processes that can produce lube oil basestocks that meet the demand for increased fuel economy, reduced emissions, etc.

SUMMARY OF THE INVENTION

Figure 1:
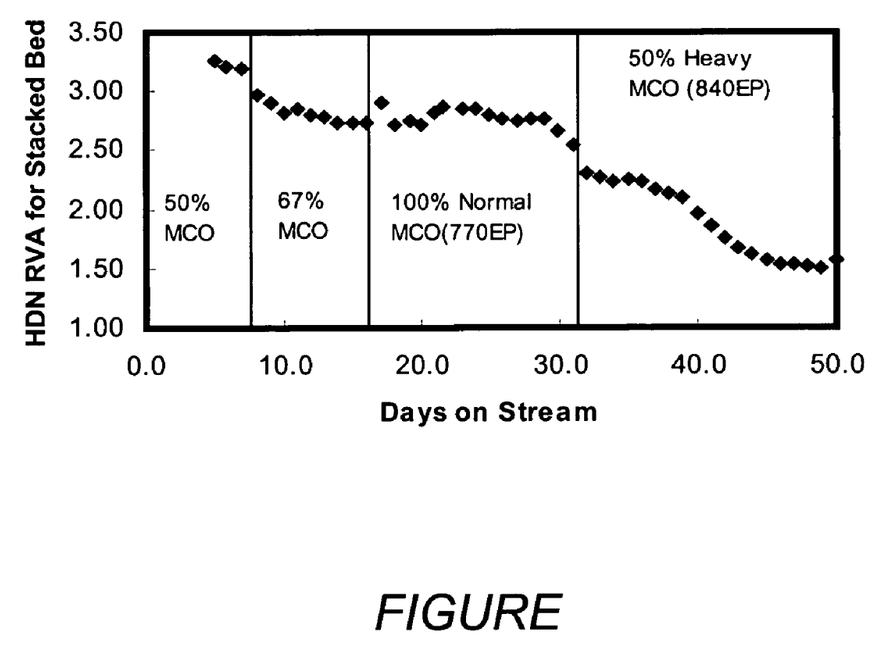
The FIGURE is a plot of the relative volume activity of various catalysts and catalyst systems versus the days the respective catalysts and catalyst systems were on stream.

The present invention is directed at a process to prepare lubricating oil basestocks having a viscosity index of about 80 to about 120 from a lube oil boiling range feedstock. The process comprises:
 a) extracting a lubricating oil feedstock in a solvent extraction zone with an extraction solvent under conditions effective at producing at least an aromatics-lean raffinate solution containing extraction solvent;
 b) removing at least a portion of the extraction solvent from the aromatics-lean raffinate solution to produce a raffinate feedstock;
 c) contacting the raffinate feedstock with a stacked bed hydrotreating catalyst system in a reaction stage operated under effective conditions thereby producing a hydrotreated effluent comprising at least gaseous product and a hydrotreated raffinate; and
 d) dewaxing said hydrotreated raffinate under effective dewaxing conditions thereby producing at least a lubricating oil basestock having a saturates content of at least 90%, a sulfur content of 0.03 wt. % or less, and a viscosity index (VI) between 80 and 120.

Another embodiment of the present invention is directed at a process to prepare lubricating oil basestocks having a viscosity index of about 80 to about 120 from a lube oil boiling range feedstock. The process comprises:
 a) conducting a lubricating oil feedstock to a solvent extraction zone and extracting the lubricating oil feedstock with an extraction solvent under conditions effective at producing at least an aromatics-lean raffinate solution containing extraction solvent;
 b) removing at least a portion of the extraction solvent from the aromatics-lean raffinate solution to produce a raffinate feedstock;
 c) contacting the raffinate feedstock with a stacked bed hydrotreating catalyst system in a reaction stage operated under effective conditions to produce a hydrotreated effluent comprising at least a gaseous product and a hydrotreated raffinate;
 d) stripping the hydrotreated effluent to remove at least a portion of the gaseous product from the hydrotreated effluent to produce a stripped raffinate; and
 e) solvent dewaxing said stripped raffinate under effective solvent dewaxing conditions thereby producing at least a lubricating oil basestock characterized as a Group II basestock having a saturates content of at least 90%, a sulfur content of 0.03 wt. % or less, and a viscosity index (VI) between 80 and 120.

In another embodiment of the instant invention, the lubricating oil feedstock is a dewaxed oil.

Thus, yet another embodiment of the present invention is directed at a process to prepare lubricating oil basestocks having a viscosity index of about 80 to about 120 from a lube oil boiling range feedstock. The process comprises:
 a) dewaxing a lubricating oil feedstock under effective dewaxing conditions thereby producing at least a dewaxed lubricating oil feedstock; and
 b) contacting the dewaxed lubricating oil feedstock with a stacked bed hydrotreating catalyst system in a reaction stage operated under effective conditions thereby producing a hydrotreated effluent comprising at least gaseous product and a hydrotreated dewaxed lubricating oil feedstock; and
 c) stripping the hydrotreated effluent to remove at least a portion of the gaseous product from the hydrotreated effluent thereby producing at least a lubricating oil basestock having a saturates content of at least 90%, a sulfur content of 0.03 wt. % or less, and a viscosity index (VI) between 80 and 120.

In yet another embodiment, the lube oil boiling range feedstock is an automatic transmission fluid feedstock.

In one embodiment of the instant invention, the stacked bed hydrotreating catalyst system comprises a first and second catalyst, the first catalyst comprising a conventional hydrotreating catalyst having an average pore diameter of greater than about 10 nm and said second catalyst comprises a bulk metal hydrotreating catalyst.

DETAILED DESCRIPTION OF THE INVENTION

It should be noted that the terms "feedstock" and "feedstream" as used herein are synonymous.

The American Petroleum Institute (API) requirements for Group II basestocks include a saturates content of at least 90%, a sulfur content of 0.03 wt. % or less and a viscosity index (VI) between 80 and 120. The present process involves hydrotreating a lubricating oil feedstock with a stacked bed hydrotreating catalyst system in a reaction stage operated under effective conditions to produce a hydrotreated effluent comprising at least a gaseous product and a hydrotreated lubricating oil feedstock. The hydrotreated effluent is stripped to remove at least a portion of the gaseous product from the hydrotreated effluent thereby producing at least a lubricating oil basestock having a saturates content of at least 90%, a sulfur content of 0.03 wt. % or less, and a viscosity index (VI) between 80 and 120. In one embodiment of the instant invention, the lubricating oil feedstock is a lubricating oil boiling range raffinate. While in another embodiment of the instant invention, the lubricating oil boiling range feedstock is a dewaxed oil.

Thus, one embodiment of the instant invention involves solvent extracting a lubricating oil feedstock in a solvent extraction zone under conditions effective at producing at least an aromatics-lean raffinate solution containing extraction solvent. At least a portion of the extraction solvent from the aromatics-lean raffinate solution is then removed, thus producing a raffinate feedstock. The raffinate feedstock is contacted with a stacked bed hydrotreating catalyst system in a reaction stage operated under effective conditions to produce a hydrotreated effluent comprising at least a gaseous product and a hydrotreated raffinate. The hydrotreated raffinate is subsequently dewaxed under effective dewaxing conditions thereby producing at least a lubricating oil basestock characterized as a Group II basestock having a saturates content of at least 90%, a sulfur content of 0.03 wt. % or less, and a viscosity index (VI) between 80 and 120. Also, since the lubricating oil feedstock can be a dewaxed oil, one embodiment of the instant invention is directed at dewaxing a lubricating oil feedstock under effective dewaxing conditions thereby producing at least a dewaxed lubricating oil feedstock. The dewaxed lubricating oil feedstock is then contacted with a stacked bed hydrotreating catalyst system in a reaction stage operated under effective conditions thereby producing a hydrotreated effluent comprising at least gaseous product and a hydrotreated dewaxed lubricating oil feedstock. The hydrotreated effluent is then stripped to remove at least a portion of the gaseous product from the hydrotreated effluent thereby producing at least a lubricating oil basestock having a saturates content of at least 90%, a sulfur content of 0.03 wt. % or less, and a viscosity index (VI) between 80 and 120.

Lubricating Oil Feedstocks

Feedstocks suitable for use in the present invention are wax-containing feeds that boil in the lubricating oil range, typically having a 10% distillation point greater than 650° F. (343° C.) and an endpoint greater than 800° F. (426° C.), measured by ASTM D 86 or ASTM 2887. These feedstocks can be derived from mineral sources, synthetic sources, or a mixture of the two. Non-limiting examples of suitable lubricating oil feedstocks include those derived from sources such as oils derived from solvent refining processes such as raffinates, partially solvent dewaxed oils, deasphalted oils, distillates, vacuum gas oils, coker gas oils, slack waxes, foots oils and the like, dewaxed oils, automatic transmission fluid feedstocks, and Fischer-Tropsch waxes. Preferred lubricating oil feedstocks are those selected from raffinates, automatic transmission fluid feedstocks, and dewaxed oils. Automatic transmission fluid ("ATF") feedstocks are lube oil feedstocks having an initial boiling point between about 200° C. and 275° C., and a 10% distillation point greater than about 300° C. ATF feedstocks are typically 75-110N feedstocks.

These feedstocks may also have high contents of nitrogen- and sulfur-contaminants. Feeds containing up to 0.2 wt. % of nitrogen, based on feed and up to 3.0 wt. % of sulfur can be processed in the present process. Feeds having a high wax content typically have high viscosity indexes of up to 200 or more. Sulfur and nitrogen contents may be measured by standard ASTM methods D5453 and D4629, respectively.

Solvent Extraction

As mentioned above, in one embodiment of the instant invention, the lubricating oil feedstock is a raffinate. In order to produce the raffinate used herein, one of the above-defined lubricating oil feedstocks are solvent extracted. The solvent extraction process selectively dissolves the aromatic components in an aromatics-rich extract solution while leaving the more paraffinic components in the "aromatics-lean raffinate solution". Naphthenes are distributed between the extract and raffinate phases. Typical solvents for solvent extraction include phenol, furfural and N-methyl pyrrolidone. By controlling the solvent to oil ratio, extraction temperature and method of contacting distillate to be extracted with solvent, one can control the degree of separation between the extract and raffinate phases.

In the solvent extraction process, the lube oil feedstocks are subjected to solvent extraction in a solvent extraction zone. In the solvent extraction zone, a lube oil boiling range feedstock as defined above, is contacted with an extraction solvent. The extraction solvent used herein is not critical and can be any solvent known that has an affinity for aromatic hydrocarbons in preference to non-aromatic hydrocarbons. Non-limiting examples of such solvents include sulfolane, furfural, phenol, and N-methyl pyrrolidone ("NMP"). Furfural, phenol, and NMP are preferred, with NMP being more preferred.

The contacting of the lube oil boiling range feedstream with the extraction solvent can be accomplished by any suitable solvent extraction method. Non-limiting examples of such include batch, semi-batch, or continuous. It is preferred that the extraction process be a continuous process, and it is more preferred that the continuous process be operated in a counter-current fashion. In a counter-current configuration, it is preferred that the lube oil boiling range feedstream be introduced into the bottom of an elongated contacting zone or tower and caused to flow in an upward direction while the extraction solvent is introduced at the top of the tower and allowed to flow in a downward direction, counter-current to the upflowing lube oil boiling range feedstream. In this configuration, the lube oil boiling range feedstream is forced to pass counter-currently to the extraction solvent resulting in the intimate contact between the extraction solvent and the lube oil boiling range feedstock. The extraction solvent and the lube oil boiling range feedstream thus migrate to opposite ends of the contacting zone.

The contacting of the lube oil boiling range feedstream with the extraction solvent produces at least an aromatics-lean raffinate solution, which contains extraction solvent. The aromatics-lean raffinate solution is then treated to remove at least a portion of the extraction solvent contained therein, thus producing a raffinate feedstock. The removal of at least a portion of the extraction solvent can be done by any means known in the art effective at separating at least a portion of an extraction solvent from an aromatics lean raffinate solution. Preferably the raffinate feedstock is produced by separating at least a portion of the first extraction solvent from the aromatics-lean raffinate solution in a stripping or distillation tower. By at least a portion, it is meant that at least about 80 vol. %, preferably about 90 vol. %, more preferably 95 vol. %, based on the aromatics-lean raffinate solution, of the extraction solvent is removed from the aromatics-lean raffinate solution. Most preferably substantially all of the extraction solvent is removed.

It should be noted that the phrase "aromatics-lean raffinate solution" is not synonymous with the phrase "raffinate feedstock". The phrase "aromatics-lean raffinate solution" is meant to refer to the products of solvent extraction before the solvent has been removed, i.e. distilled or stripped, from the respective phases. Thus, "raffinate feedstock", as used herein, refers to the raffinate product after at least a portion of the solvent contained in the "aromatics-lean raffinate solution" has been removed.

Hydrotreating

It should be noted that the term "hydrotreating" as used herein refers to processes wherein a hydrogen-containing treat gas is used in the presence of a suitable catalyst that is primarily active for the removal of heteroatoms, such as sulfur, and nitrogen, and saturation of aromatics. In the practice of the present invention, the lubricating oil feedstock is hydrotreated with a stacked bed hydrotreating catalyst system in a reaction stage operated under effective conditions to produce a hydrotreated effluent comprising at least a gaseous product and a hydrotreated lubricating oil feedstock. If the lubricating oil feedstock is a raffinate, then the hydrotreating step or stage occurs after solvent extraction. If the lubricating oil feedstock is a dewaxed oil, then the hydrotreating step or stage occurs after a dewaxing.

The catalyst system used herein comprises at least a first and second hydrotreating catalyst. By "stacked bed" it is meant that the first catalyst appears in a separate catalyst bed, reactor, or reaction zone, and the second hydrotreating catalyst appears in a separate catalyst bed, reactor, or reaction zone downstream, in relation to the flow of the lubricating oil feedstock, from the first catalyst.

The first hydrotreating catalyst is a supported catalyst. Suitable hydrotreating catalysts for use as the first catalyst of the present catalyst system include any conventional hydrotreating catalyst. Conventional hydrotreating catalyst as used herein is meant to refer to those which are comprised of at least one Group VIII metal, preferably Fe, Co and Ni, more preferably Co and/or Ni, and most preferably Ni; and at least one Group VI metal, preferably Mo and W, more preferably Mo, on a high surface area support material, preferably alumina. The Group VIII metal is typically present in an amount ranging from about 2 to 20 wt. %, preferably from about 4 to 12%. The Group VI metal will typically be present in an amount ranging from about 5 to 50 wt. %, preferably from about 10 to 40 wt. %, and more preferably from about 20 to 30 wt. %. All metals weight percents are on support. By "on support" we mean that the percents are based on the weight of the support. For example, if the support were to weigh 100 g. then 20 wt. % Group VIII metal would mean that 20 g. of Group VIII metal was on the support.

However, not all conventional hydrotreating catalysts fitting the above-described criteria are suitable for use in the present invention. The inventors hereof have unexpectedly found that the average pore diameter of the first catalyst must have a specific size to be suitable for use herein. Thus, in the practice of the present invention, a conventional catalyst, as described above, but having an average pore diameter greater than 10 nm, as measured by water adsorption porosimetry, must be used as the first catalyst of the present stacked bed catalyst system. It is preferred that the average pore diameter of the first catalyst, i.e. the conventional hydrotreating catalyst, of the present stacked bed catalyst system be greater than 11 nm, more preferably greater than 12 nm.

The second hydrotreating catalyst is a bulk metal catalyst. By bulk metal, it is meant that the catalysts are unsupported wherein the bulk catalyst particles comprise 30-100 wt. % of at least one Group VIII non-noble metal and at least one Group VIB metal, based on the total weight of the bulk catalyst particles, calculated as metal oxides and wherein the bulk catalyst particles have a surface area of at least 10 m$^2$/g. It is furthermore preferred that the bulk metal hydrotreating catalysts used herein comprise about 50 to about 100 wt. %, and even more preferably about 70 to about 100 wt. %, of at least one Group VIII non-noble metal and at least one Group VIB metal, based on the total weight of the particles, calculated as metal oxides. The amount of Group VIB and Group VIII non-noble metals can easily be determined VIB TEM-EDX.

Bulk catalyst compositions comprising one Group VIII non-noble metal and two Group VIB metals are preferred. It has been found that in this case, the bulk catalyst particles are sintering-resistant. Thus the active surface area of the bulk catalyst particles is maintained during use. The molar ratio of Group VIB to Group VIII non-noble metals ranges generally from 10:1-1:10 and preferably from 3:1-1:3. In the case of a core-shell structured particle, these ratios of course apply to the metals contained in the shell. If more than one Group VIB metal is contained in the bulk catalyst particles, the ratio of the different Group VIB metals is generally not critical. The same holds when more than one Group VIII non-noble metal is applied. In the case where molybdenum and tungsten are present as Group VIB metals, the molybenum:tungsten ratio preferably lies in the range of 9:1-1:9. Preferably the Group VIII non-noble metal comprises nickel and/or cobalt. It is further preferred that the Group VIB metal comprises a combination of molybdenum and tungsten. Preferably, combinations of nickel/molybdenum/tungsten and cobalt/molybdenum/tungsten and nickel/cobalt/molybdenum/tungsten are used. These types of precipitates appear to be sinter-resistant. Thus, the active surface area of the precipitate is remained during use. The metals are preferably present as oxidic compounds of the corresponding metals, or if the catalyst composition has been sulfided, sulfidic compounds of the corresponding metals.

It is also preferred that the bulk metal hydrotreating catalysts used herein have a surface area of at least 50 m$^2$/g and more preferably of at least 100 m$^2$/g. It is also desired that the pore size distribution of the bulk metal hydrotreating catalysts be approximately the same as the one of conventional hydrotreating catalysts. More in particular, these bulk metal hydrotreating catalysts have preferably a pore volume of 0.05-5 ml/g, more preferably of 0.1-4 ml/g, still more preferably of 0.1-3 ml/g and most preferably 0.1-2 ml/g determined by nitrogen adsorption. Preferably, pores smaller than 1 nm are not present. Furthermore these bulk metal hydrotreating catalysts preferably have a median diameter of at least 50 nm, more preferably at least 100 nm, and preferably not more than 5000 µm and more preferably not more than 3000 µm. Even more preferably, the median particle diameter lies in the range of 0.1-50 µm and most preferably in the range of 0 5-50 µm.

The reaction stage containing the stacked bed hydrotreating catalyst system used in the present invention can be comprised of one or more fixed bed reactors or reaction zones each of which can comprise one or more catalyst beds of the same or different catalyst. Although other types of catalyst beds can be used, fixed beds are preferred. Such other types of catalyst beds include fluidized beds, ebullating beds, slurry beds, and moving beds. Interstage cooling or heating between reactors, reaction zones, or between catalyst beds in the same reactor, can be employed since some olefin saturation can take place, and olefin saturation and the desulfurization reaction are generally exothermic. A portion of the heat generated during hydrotreating can be recovered. Where this heat recovery option is not available, conventional cooling may be performed through cooling utilities such as cooling water or air, or through use of a hydrogen quench stream. In this manner, optimum reaction temperatures can be more easily maintained.

The catalyst system of the present invention comprises about 5-95 vol. % of the first catalyst with the second catalyst comprising the remainder, preferably about 40-60 vol. %, more preferably about 5 to about 50 vol. %. Thus, if the catalyst system comprises 50 vol. % of the first catalyst, the second catalyst will comprise 50 vol. % also.

Effective hydrotreating conditions include temperatures of from 150 to 400° C., a hydrogen partial pressure of from 1480 to 20786 kPa (200 to 3000 psig), a space velocity of from 0.1 to 10 liquid hourly space velocity (LHSV), and a hydrogen to feed ratio of from 89 to 1780 m$^3$/m$^3$ (500 to 10000 scf/B).

As stated above, the contacting of the lube oil boiling range feedstock with the stacked bed hydrotreating catalyst system produces a hydrotreated effluent comprising at least a gaseous product and a hydrotreated lubricating oil feedstock. The hydrotreated effluent is stripped to remove at least a portion of the gaseous product from the hydrotreated effluent thereby producing at least a lubricating oil basestock The means used herein to strip the hydrotreated effluent is not critical to the present invention. Thus, any stripping method, process, or means known can be used. Non-limiting examples of suitable stripping methods, means, and processes include flash drums, fractionators, knock-out drums, steam stripping, etc. After stripping, the raffinate is referred to as a stripped raffinate herein.

Dewaxing

As previously mentioned, embodiment of the present invention involves dewaxing a lubricating oil feedstock to be used as the lubricating oil feedstream for use in the hydrotreating reaction stage. If this embodiment of the present invention is employed, a lubricating oil feedstock, as described above, is dewaxed, either catalytically or solvent, to produce a dewaxed lubricating oil feedstock, also referred to as a dewaxed oil herein. The dewaxed lubricating oil feedstock is subsequently hydrotreated as described above to produce a hydrotreated effluent comprising at least a gaseous product and a hydrotreated lubricating oil feedstock, which is subsequently stripped in a stripping zone. This process also produces a thereby producing at least a lubricating oil basestock characterized as a lubricating oil basestock meeting API requirements for Group II basestocks as described above, including preferred ranges.

Also, as previously stated, one embodiment of the present invention is directed at an integrated process involving solvent extraction, as described above, hydrotreating, as described above, followed by optional stripping and dewaxing. If this process is employed, the hydrotreated raffinate, or stripped raffinate if stripping is employed, is dewaxed under effective dewaxing conditions thereby producing at least a lubricating oil basestock characterized as a Group II basestock under American Petroleum Institute (API) requirements. API requirements for Group II basestocks include the conditions that the basestock have a saturates content of at least 90%, a sulfur content of 0.03 wt. % or less, and a viscosity index (VI) between 80 and 120.

Any type of solvent dewaxing and catalytic dewaxing known can be used in the embodiments of the present invention disclosed herein. Below are non-limiting examples of both solvent dewaxing and catalytic dewaxing steps suitable for use in the present invention as contemplated herein.

Solvent Dewaxing

In solvent-dewaxing, an effective amount of any suitable dewaxing solvent may be used, for example, between about 50 and about 700 vol. % solvent to oil ratio, most preferably between about 100 and 500 vol. % solvent to oil ratio may be used. Non-limiting examples of suitable dewaxing solvents include methyl ethyl ketone ("MEK") and methyl isobutyl ketone ("MIBK"). Preferred dewaxing solvents include a mixture of MEK and MIBK, preferred are those mixtures containing about 30 vol. % MEK, based on the total volume of the solvent.

Effective solvent dewaxing conditions as used herein include any solvent dewaxing conditions known in the art, and are those conditions chosen to maximize the performance of the dewaxing solvent chosen.

Catalytic Dewaxing—Dewaxing Catalyst

The dewaxing catalyst may be either crystalline or amorphous. Crystalline materials are molecular sieves that contain at least one 10 or 12 ring channel and may be based on aluminosilicates (zeolites) or on aluminophosphates such as silicoaluminophosphates (SAPOs) and MAPOs. Zeolites used for oxygenate treatment may contain at least one 10 or 12 channel. Examples of such zeolites include ZSM-22, ZSM-23, ZSM-35, ZSM-48, ZSM-57, ferrierite, ITQ-13, MCM-68 and MCM-71. Examples of aluminophosphates containing at least one 10 ring channel include ECR-42. Examples of molecular sieves containing 12 ring channels include zeolite beta, and MCM-68. The molecular sieves are described in U.S. Pat. Nos. 5,246,566; 5,282,958; 4,975,177; 4,397,827; 4,585,747; 5,075,269; and 4,440,871. MCM-68 is described in U.S. Pat. No. 6,310,265. MCM-71 and ITQ-13 are described in PCT published applications WO 0242207 and WO 0078677. ECR-42 is disclosed in U.S. Pat. No. 6,303,534. Suitable SAPOs for use herein include SAPO-11, SAPO-31, SAPO-41, and suitable MAPOs include MAPO-11. SSZ-31 is also a catalyst that can be effectively used herein. Preferred catalysts include ZSM-48, ZSM-22 and ZSM-23. Especially preferred is ZSM-48. The molecular sieves are preferably in the hydrogen form. Reduction can occur in situ during the dewaxing step itself or can occur ex situ in another vessel.

Amorphous dewaxing catalysts include alumina, fluorided alumina, silica-alumina, fluorided silica-alumina and silica-alumina doped with Group IIIB metals. Such catalysts are described for example in U.S. Pat. Nos. 4,900,707 and 6,383,366. The dewaxing catalysts used herein are bifunctional, i.e., they are loaded with at least one metal hydrogenation component, which is selected from Group VI metals, Group VIII metals, or mixtures thereof. Preferred metals are selected from Group VIII metals. Especially preferred are Group VIII noble metals such as Pt, Pd or mixtures thereof. These metals are loaded at the rate of 0.1 to 30 wt. %, based on catalyst. Catalyst preparation and metal loading methods are described for example in U.S. Pat. No. 6,294,077, and include for example ion exchange and impregnation using decomposable metal salts. Metal dispersion techniques and catalyst particle size control techniques are described in U.S. Pat. No. 5,282,958. Catalysts with small particle size and well-dispersed metal are preferred.

The molecular sieves are typically composited with binder materials which are resistant to high temperatures which may be employed under dewaxing conditions to form a finished dewaxing catalyst or may be binderless (self bound). The binder materials are usually inorganic oxides such as silica, alumina, silica-aluminas, binary combinations of silicas with other metal oxides such as titania, magnesia, thoria, zirconia and the like and tertiary combinations of these oxides such as silica-alumina-thoria and silica-alumina magnesia. The amount of molecular sieve in the finished dewaxing catalyst is from 10 to 100, preferably 35 to 100 wt. %, based on catalyst. Such catalysts are formed by methods such spray drying, extrusion and the like. The dewaxing catalyst may be used in the sulfided or unsulfided form, and is preferably in the sulfided form.

Effective catalytic dewaxing conditions as used herein includes temperatures of from 250-400° C., preferably 275 to 350° C., pressures of from 791 to 20786 kPa (100 to 3000 psig), preferably 1480 to 17339 kPa (200 to 2500 psig), liquid hourly space velocities of from 0.1 to 10 hr$^{-1}$, preferably 0.1 to 5 hr$^{-1}$ and hydrogen treat gas rates from 45 to 1780 m$^3$/m$^3$ (250 to 10000 scf/B), preferably 89 to 890 m$^3$/m$^3$ (500 to 5000 scf/B).

The above description is directed to preferred embodiments of the present invention. Those skilled in the art will recognize that other embodiments that are equally effective could be devised for carrying out the spirit of this invention.

The following examples will illustrate the improved effectiveness of the present invention, but is not meant to limit the present invention in any fashion.

EXAMPLES

Example 1

A medium vacuum gas oil having the properties outlined in Table 1 was processed in an isothermal pilot plant over three catalysts systems at 1200 psig hydrogen partial pressure. The catalyst systems and operating conditions are given in Table 2. Catalyst B is a conventional hydrotreating catalyst having about 4.5 wt. % Group VI metal, about 23 wt. % Group VIII metal on an alumina support and has an average pore size of 14.0 nm. The bulk metal hydrotreating catalyst was a commercial bulk metal hydrotreating catalyst marketed under the name Nebula by Akzo-Nobel.

In the Examples, all the catalyst systems were lined out at about 50 days on stream. A first order kinetic model with an activation energy of 31,000 cal/gmol was used to compare volume activities between the catalysts.

TABLE 1

|  | Medium Vacuum Gas Oil |
|---|---|
| Density at 70° C. (g/cc) | 0.88 |
| Nitrogen (wppm) | 700 |
| Sulfur (wt. %) | 2.6 |
| GCD 5 WT % Boiling Point (° C.) | 334 |
| GCD 50 WT % Boiling Point (° C.) | 441 |
| GCD 95 WT % Boiling Point (° C.) | 531 |

TABLE 2

| Catalyst System | 100 vol. % Catalyst B | 100 vol. % Nebula 1 | 50 vol. % Catalyst B followed by 50 vol. % Nebula 1 |
|---|---|---|---|
| Average Catalyst Temperature (° C.) | 370 | 380 | 370 |
| Liquid Hourly Space Velocity (hr$^{-1}$) | 2 | 1 | 1 |
| Stripped reactor Effluent Nitrogen Content (wppm) | 227 | 17 | 34 |
| Nitrogen Removal Relative Volume Activity | 1 | 1.18 | 1.34 |

The Nitrogen Removal Relative Volume Activity ("RVA") for each catalyst system was calculated by simple first order kinetic modeling. As shown in Table 2, the 50/50 vol. % stacked bed catalyst system, with the large average pore size Catalyst B upstream of the bulk metal catalyst, showed higher nitrogen removal activity than either of the single catalyst systems demonstrated on their own.

Example 2

The hydrotreating ability of different stacked beds of Catalyst B and Nebula were analyzed by hydrotreating different feedstreams over the stacked beds in the in two parallel reactor trains of the same isothermal pilot plant unit used in Example 1 above. The feedstreams used were Medium Cycle Oils ("MCO") from an FCC unit and blends of the MCO with a virgin feedstock were tested in two parallel reactor trains. The feed properties are described in Table 3, below.

In this Example, one reactor train consisted entirely of a conventional NiMo on Alumina hydrotreating catalyst, Catalyst C, with an average pore diameter of 7.5 nm. The other reactor train contained a stacked bed system with 75-vol. % of Catalyst C followed by 25-vol. % of Catalyst A, a bulk multimetallic sulfide catalyst having an average pore diameter of 5.5 nm.

The separate reactors in both trains were immersed in a fluidized sandbath for efficient heat transfer. Thus, the temperature of the first 75-vol. % of Catalyst C was at the same temperature whether it was in train 1 or 2. Likewise, the last 25-vol. % of Catalyst C in train 1 was at the same temperature as the last 25-vol. % of Catalyst A in train 2. Therefore, In Example 2, each of the two reactor trains was divided into two separate reactor vessels where the temperature of the first 75-volume % containing 75 vol. % of the catalyst loading of that reactor could be independently controlled from the last 25-volume % of catalyst.

The operating conditions for the two trains were 1350 psig H$_2$, liquid hourly space velocities ("LHSV") of 1.4 vol./hr/vol., and 5500-6300 CF/B of hydrogen. The temperature schedule for both trains is described in Table 4 below.

TABLE 3

| | FEED | | | |
|---|---|---|---|---|
| | 50% Normal FCC MCO | 67% Normal FCC MCO | 100% Normal FCC MCO | 100% Heavy FCC MCO |
| API Gravity | 18.1 | 15.0 | 9.5 | 7.0 |
| Hydrogen, wt. % | 10.65 | 10.04 | 8.77 | 8.61 |
| Sulfur, wt. % | 3.23 | 3.53 | 4.28 | 4.40 |
| Nitrogen, ppm | 959 | 1153 | 1485 | 1573 |
| Aromatics-Mono, wt. % | — | — | 12.0 | 8.8 |
| Aromatics-Di, wt. % | — | — | 43.9 | 41.7 |
| Aromatics-Poly, wt. % | — | — | 22.4 | 30.7 |
| Distillation, D2887 GCD | | | | |
| 10 | 498 | 493 | 485 | 493 |
| 50 | 627 | 625 | 618 | 642 |
| 90 | 703 | 705 | 706 | 749 |
| 95 | 726 | 721 | 724 | 777 |

TABLE 4

| Days on Oil | Feedstock | 75%/25% Temperatures, ° F. |
|---|---|---|
| 4-6 | 50% FCC MCO | 585/650 |
| 7-15 | 67% FCC MCO | 585/650 |
| 16-30 | 100% FCC MCO | 585-610/650-675 |
| 31-50 | 100% Heavy FCC MCO | 610-635/675-700 |

The relative HDN volume activity of the stacked bed Catalyst C/Catalyst A compared to Catalyst A is shown in the FIGURE below. Note that for the 50%, 67% and 100% FCC MCO feeds the stacked bed system with only 25-volume % of Catalyst A shows a stable activity advantage of about 275%.

As shown in the FIGURE, when the 100% Heavy FCC MCO was used as the feed note the activity advantage for the stacked bed catalyst system begins to decrease from about 275% to about 225% and then was subsequently reduced over about 20 days to slightly less than 150%.

Example 3

In this Example, a stacked bed catalyst system containing 75 vol. % of Catalyst B and 25 vol. % Nebula, both as described above, was used to hydrotreat a light cycle cat oil feed ("Feed A") and a heavier medium cycle cat oil feed ("Feed B") as described in Table 5 below. Example 2 was conducted in the same two reactor train pilot plant unit as described in Example 2 above. The operating conditions for the two trains were 1200 psig $H_2$, liquid hourly space velocities of 2 vol./hr/vol., and 5000 SCF/B of hydrogen.

The reactor effluents were stripped with nitrogen in an oven at 100° C. to remove substantially all of the gaseous reaction products. The nitrogen content of the liquid reactor effluent was then analyzed by ASTM 4629. The temperature schedules for both trains along with the results of this example are described in Table 5 below.

TABLE 5

| | FEED | |
|---|---|---|
| | Feed A | Feed B |
| API Gravity | 0.973 | 0.9 |
| Sulfur, wt. % | 2.6 | 2.50 |
| Nitrogen, ppm | 713 | 742 |
| Distillation, D2887 GCD | | |
| 5 | 427 | 448 |
| 50 | 551 | 590 |
| 95 | 707 | 755 |
| EP | 764 | 823 |
| Catalyst B Temperature | 570 | 617 |
| Nebula Temperature | 645 | 692 |
| Stripped Reactor Effluent Nitrogen Content | 2 | 7 |
| Nitrogen Removal Relative Volume Activity | 1.75 | 1.75 |

As can be seen in Table 5, when a conventional catalyst having an average pore diameter of 14 nm was used in the first 75 vol. % of the reactor, the Nitrogen Removal Relative Volume Activity ("RVA") for the catalyst system remained constant when the heavier feed was used. In comparing the results of Example 3 to those obtained in Example 2, one can see that when a catalyst having a pore volume of 7.5 nm preceded the bulk metal catalyst, the RVA of the catalyst system decreased. However, in Example 3, the heavier feed did not negatively impact the RVA of the catalyst system.

The invention claimed is:

1. A process to prepare lubricating oil basestocks having a VI of at least about 80 to about 120 from a lube oil boiling range feedstock comprising:
    a) extracting a lubricating oil feedstock having a distillation endpoint greater than 800° F. (426° C.), measured by ASTM D 86 or ASTM 2887, in a solvent extraction zone with an extraction solvent under conditions effective at producing at least an aromatics-lean raffinate solution containing extraction solvent;
    b) removing at least a portion of the extraction solvent from the aromatics-lean raffinate solution to produce a raffinate feedstock;
    c) contacting the raffinate feedstock with a stacked bed hydrotreating catalyst system comprising at least a first and second hydrotreating catalyst in a reaction stage operated under effective conditions thereby producing a hydrotreated effluent comprising at least a gaseous product and a hydrotreated raffinate; and
    d) dewaxing said hydrotreated raffinate under effective dewaxing conditions thereby producing at least a lubricating oil basestock having a saturates content of at least 90%, a sulfur content of 0.03 wt. % or less, and a viscosity index (VI) between 80 and 120,
    wherein said first hydrotreating catalyst is selected from supported hydrotreating catalysts comprising about 2 to 20 wt. % of at least one Group VIII metal, and about 5 to 50 wt. % of at least one Group VI metal on a high surface area support material having an average pore diameter of greater than 10 nm and said second hydrotreating catalyst is a bulk metal hydrotreating catalyst comprising about 30 to about 100 wt. % of at least one Group VIII non-noble metal and at least one Group VIB metal, based on the total weight of the bulk catalyst particles, calculated as metal oxides and wherein the bulk catalyst particles have a surface area of at least 10 $m^2/g$.

2. The process according to claim 1 wherein said lubricating oil feedstock has a 10% distillation point greater than 650° F. (343° C.), measured by ASTM D 86 or ASTM 2887, and is derived from mineral sources, synthetic sources, or a mixture of the two.

3. The process according to claim 2 wherein said lubricating oil feedstock is selected from those derived from sources such as oils derived from solvent refining processes such as raffinates, partially solvent dewaxed oils, deasphalted oils, distillates, vacuum gas oils, coker gas oils, slack waxes, foots oils and the like, dewaxed oils, automatic transmission fluid feedstocks, and Fischer-Tropsch waxes.

4. The process according to claim 2 wherein said lubricating oil feedstock contains up to 0.2 wt. % of nitrogen, based on the lubricating oil feedstock, and up to 3.0 wt. % of sulfur, based on the lubricating oil feedstock.

5. The process according to claim 3 wherein said lubricating oil feedstock is selected from automatic transmission fluid feedstocks.

6. The process according to claim 1 wherein said process further comprises: a) stripping the hydrotreated effluent to remove at least a portion of the gaseous product from the hydrotreated effluent thereby producing a stripped raffinate.

7. The process according to claim 1 wherein dewaxing said hydrotreated raffinate comprises a solvent dewaxing said hydrotreated raffinate under effective solvent dewaxing conditions thereby producing at least a lubricating oil basestock characterized as a Group II basestock having a saturates content of at least 90%, a sulfur content of 0.03 wt. % or less, and a viscosity index (VI) between 80 and 120.

8. The process according to claim 6 wherein dewaxing said hydrotreated raffinate comprises contacting said hydrotreated raffinate with at least one dewaxing catalyst in a dewaxing zone operated under effective catalytic dewaxing conditions, wherein said dewaxing catalyst is selected from ZSM-5, ZSM-22, ZSM-23, ZSM-35, ZSM-48, ZSM-57, Beta, SSZ-31, SAPO-11, SAPO-31, SAPO-41, MAPO-11, ECR-42, fluorided alumina, silica-alumina, fluorided silica alumina, synthetic Ferrierites, Mordenite, Offretite, erionite, chabazite, and mixtures thereof, said dewaxing catalyst further comprising at least one Group VIII noble metal.

9. The process according to claim 8 wherein said effective catalytic dewaxing conditions include temperatures of from about 250 to about 400° C., pressures of from about 791 to about 20786 kPa (100 to 3000 psig), liquid hourly space velocities of from about 0.1 to about 10 hr-1, and hydrogen treat gas rates from about 45 to about 1780 m3/m3 (250 to 10000 scf/B).

10. The process according to claim 7 wherein said solvent dewaxing process comprises contacting a lubricating oil feedstock with an effective amount of a suitable dewaxing solvent at a solvent to oil ratio under effective solvent dewaxing conditions.

11. The process according to claim 1 wherein said Group VIII metal of said first hydrotreating catalyst is selected from Co Ni, and mixtures thereof, said Group VI metal of said first hydrotreating catalyst is selected from Mo, W, and mixtures thereof and said high surface area support material is selected from silica, alumina, and mixtures thereof.

12. The process according to claim 1 wherein said bulk metal hydrotreating catalyst comprises one Group VIII non-noble metal and two Group VIB metals wherein the molar ratio of Group VIB to Group VIII non-noble metals ranges from 10:1-1:10.

13. The process according to claim 12 wherein the at least one Group VIII non-noble metal and at least one Group VIB metals are present as oxidic compounds of the corresponding metals, or if the catalyst composition has been sulfided, sulfidic compounds of the corresponding metals.

14. The process according to claim 13 wherein the bulk metal hydrotreating catalysts have a surface area of at least 50 m2/g, a pore size volume of about 0.05 to about 5 ml/g, and a median diameter of at least 50 nm.

15. The process according to claim 1 wherein said effective hydrotreating conditions include temperatures of from 150 to 400° C., a hydrogen partial pressure of from 1480 to 20786 kPa (200 to 3000 psig), a space velocity of from 0.1 to 10 liquid hourly space velocity (LHSV), and a hydrogen to feed ratio of from 89 to 1780 m3/m3 (500 to 10000 scf/B).

16. The process according to claim 1 wherein the catalyst system of the present invention comprises about 5-95 vol. % of the first hydrotreating catalyst with the second hydrotreating catalyst comprising the remainder.

17. The process according to claim 1 wherein said first hydrotreating catalyst has an average pore diameter of greater than 11 nm.

18. The process according to claim 1 wherein said first hydrotreating catalyst has an average pore diameter of greater than 12 nm.

19. The process according to claim 1 wherein the catalyst system of the present invention comprises about 40-60 vol. % of the first hydrotreating catalyst with the second hydrotreating catalyst comprising the remainder.

20. The process according to claim 1 wherein the catalyst system of the present invention comprises about 5-50 vol. % of the first hydrotreating catalyst with the second hydrotreating catalyst comprising the remainder.

21. A process to prepare lubricating oil basestocks having a viscosity index of about 80 to about 120 comprising:
a) extracting a lubricating oil feedstock having a distillation endpoint greater than 800° F. (426° C.), measured by ASTM D 86 or ASTM 2887, in a solvent extraction zone with an extraction solvent under conditions effective at producing at least an aromatics-lean raffinate solution containing extraction solvent;
b) removing at least a portion of the extraction solvent from the aromatics-lean raffinate solution to produce a raffinate feedstock;
c) contacting the raffinate feedstock with a stacked bed hydrotreating catalyst system comprising at least a first and second hydrotreating catalyst in a reaction stage operated under effective conditions thereby producing a hydrotreated effluent comprising at least gaseous product and a hydrotreated raffinate; and
d) dewaxing said hydrotreated raffinate under effective dewaxing conditions thereby producing at least a lubricating oil basestock having a saturates content of at least 90%, a sulfur content of 0.03 wt. % or less, and a viscosity index (VI) between 80 and 120,
wherein said first hydrotreating catalyst is selected from supported hydrotreating catalysts comprising about 2 to 20 wt. % of at least one Group VIII metal, and about 5 to 50 wt. % of at least one Group VI metal on a high surface area support material having an average pore diameter of greater than 10 nm and said second hydrotreating catalyst is selected from bulk metal hydrotreating catalysts comprising about 30 to about 100 wt. % of at least one Group VIII non-noble metal and at least one Group VIB metal, based on the total weight of the bulk catalyst particles, calculated as metal oxides and wherein the bulk catalyst particles have a surface area of at least 10 m2/g.

22. The process according to claim 21 wherein said lubricating oil feedstock has a 10% distillation point greater than 650° F. (343° C.), measured by ASTM D 86 or ASTM 2887, and are derived from mineral sources, synthetic sources, or a mixture of the two.

23. The process according to claim 21 wherein dewaxing said hydrotreated raffinate comprises solvent dewaxing said hydrotreated raffinate under effective solvent dewaxing conditions thereby producing at least a lubricating oil basestock characterized as a Group II basestock having a saturates content of at least 90%, a sulfur content of 0.03 wt. % or less, and a viscosity index (VI) between 80 and 120.

24. The process according to claim 21 wherein dewaxing said hydrotreated raffinate comprises contacting said hydrotreated raffinate with at least one dewaxing catalyst in a dewaxing zone operated under effective catalytic dewaxing conditions, wherein said dewaxing catalyst is selected from ZSM-5, ZSM-22, ZSM-23, ZSM-35, ZSM-48, ZSM-57, Beta, SSZ-31, SAPO-11, SAPO-31, SAPO-41, MAPO-11, ECR-42, fluorided alumina, Silica-alumina, fluorided silica alumina, synthetic Ferrierites, Mordenite, Offretite, erionite, chabazite, and mixtures thereof said dewaxing catalyst further comprising at least one Group VIII noble metal.

25. The process according to claim 24 wherein said effective catalytic dewaxing conditions include temperatures of from about 250 to about 400° C., pressures of from about 791 to about 20786 kPa (100 to 3000 psig), liquid hourly space velocities of from about 0.1 to about 10 hr$^{-1}$, and hydrogen treat gas rates from about 45 to about 1780 m$^3$/m$^3$ (250 to 10000 scf/B).

26. The process according to claim 23 wherein said solvent dewaxing process comprises contacting a lubricating oil feedstock with an effective amount of a suitable dewaxing solvent at a solvent to oil ratio under effective solvent dewaxing conditions.

27. The process according to claim 21 wherein said Group VIII metal of said first hydrotreating catalyst is selected from Co Ni, and mixtures thereof, said Group VI metal of said first hydrotreating catalyst is selected from Mo, W, and mixtures thereof and said high surface area support material is selected from silica, alumina, and mixtures thereof.

28. The process according to claim 21 wherein said bulk metal hydrotreating catalyst comprises one Group VIII non-noble metal and two Group VIB metals wherein the molar ratio of Group VIB to Group VIII non-noble metals ranges from 10:1-1:10.

29. The process according to claim 28 wherein the at least one Group VIII non-noble metal and at least one Group VIB metal of the bulk metal hydrotreating catalyst are present as oxidic compounds of the corresponding metals, or if the catalyst composition has been sulfided, sulfidic compounds of the corresponding metals.

30. The process according to claim 21 wherein the bulk metal hydrotreating catalysts have a surface area of at least 50 m2/g, a pore size volume of about 0.05 to about 5 ml/g, and a median diameter of at least 50 nm.

31. The process according to claim 21 wherein said effective hydrotreating conditions include temperatures of from 150 to 400° C., a hydrogen partial pressure of from 1480 to 20786 kPa (200 to 3000 psig), a space velocity of from 0.1 to 10 liquid hourly space velocity (LHSV), and a hydrogen to feed ratio of from 89 to 1780 m3/m3 (500 to 10000 scf/B).

32. The process according to claim 21 wherein the catalyst system of the present invention comprises about 5-95 vol. % of the first hydrotreating catalyst with the second hydrotreating catalyst comprising the remainder.

33. The process according to claim 21 wherein said first hydrotreating catalyst has an average pore diameter of greater than 11 nm.

34. The process according to claim 21 wherein said first hydrotreating catalyst has an average pore diameter of greater than 12 nm.

35. The process according to claim 21 wherein the catalyst system of the present invention comprises about 40-60 vol. % of the first hydrotreating catalyst with the second hydrotreating catalyst comprising the remainder.

36. The process according to claim 21 wherein the catalyst system of the present invention comprises about 5-50 vol. % of the first hydrotreating catalyst with the second hydrotreating catalyst comprising the remainder.

37. A process to prepare lubricating oil basestocks having a viscosity index of about 80 to about 120 comprising:
   a) dewaxing a lubricating oil feedstock under effective dewaxing conditions thereby producing at least a dewaxed lubricating oil feedstock, the dewaxed lubricating oil feedstock having a distillation endpoint greater than 800° F., measured by ASTM D 86 or ASTM 2887; and
   b) contacting the dewaxed lubricating oil feedstock with a stacked bed hydrotreating catalyst system comprising at least a first and second hydrotreating catalyst in a reaction stage operated under effective conditions thereby producing a hydrotreated effluent comprising at least gaseous product and a hydrotreated dewaxed lubricating oil feedstock; and
   c) stripping the hydrotreated effluent to remove at least a portion of the gaseous product from the hydrotreated effluent thereby producing at least a lubricating oil basestock having a saturates content of at least 90%, a sulfur content of 0.03 wt. % or less, and a viscosity index (VI) between 80 and 120,
   wherein said first hydrotreating catalyst is selected from supported hydrotreating catalysts comprising about 2 to 20 wt. % of at least one Group VIII metal, and about 5 to 50 wt. % of at least one Group VI metal on a high surface area support material having an average pore diameter of greater than 10 nm and said second hydrotreating catalyst is selected from bulk metal hydrotreating catalysts comprising about 30 to about 100 wt. % of at least one Group VIII non-noble metal and at least one Group VIB metal, based on the total weight of the bulk catalyst particles, calculated as metal oxides and wherein the bulk catalyst particles have a surface area of at least 10 m$^2$/g.

38. The process according to claim 37 wherein dewaxing said hydrotreated raffinate comprises solvent dewaxing said hydrotreated raffinate under effective solvent dewaxing conditions thereby producing at least a lubricating oil basestock characterized as a Group II basestock having a saturates content of at least 90%, a sulfur content of 0.03 wt. % or less, and a viscosity index (VI) between 80 and 120.

39. The process according to claim 37 wherein dewaxing said hydrotreated raffinate comprises contacting said hydrotreated raffinate with at least one dewaxing catalyst in a dewaxing zone operated under effective catalytic dewaxing conditions, wherein said dewaxing catalyst is selected from ZSM-5, ZSM-22, ZSM-23, ZSM-35, ZSM-48, ZSM-57, Beta, SSZ-31, SAPO-11, SAPO-31, SAPO-41, MAPO-11, ECR-42, fluorided alumina, silica-alumina, fluorided silica alumina, synthetic Ferrierites, Mordenite, Offretite, erionite, chabazite, and mixtures thereof, said dewaxing catalyst further comprising at least one Group VIII noble metal.

40. The process according to claim 39 wherein said effective catalytic dewaxing conditions include temperatures of from about 250 to about 400° C., pressures of from about 791 to about 20786 kPa (100 to 3000 psig), liquid hourly space velocities of from about 0.1 to about 10 hr-1, and hydrogen treat gas rates from about 45 to about 1780 m3/m3 (250 to 10000 scf/B).

41. The process according to claim 38 wherein said solvent dewaxing process comprises contacting a lubricating oil feedstock with an effective amount of a suitable dewaxing solvent at a solvent to oil ratio under effective solvent dewaxing conditions.

42. The process according to claim 37 wherein said Group VIII metal of said first hydrotreating catalyst is selected from Co Ni, and mixtures thereof, said Group VI metal of said first hydrotreating catalyst is selected from Mo, W, and mixtures thereof and said high surface area support material is selected from silica, alumina, and mixtures thereof.

43. The process according to claim 37 wherein said bulk metal hydrotreating catalyst comprises one Group VIII non-noble metal and two Group VIB metals wherein the molar ratio of Group VIB to Group VIII non-noble metals ranges from 10:1-1:10.

44. The process according to claim 37 wherein the at least one Group VIII non-noble metal and at least one Group VIB metal of the bulk metal hydrotreating catalyst are present as oxidic compounds of the corresponding metals, or if the catalyst composition has been sulfided, sulfidic compounds of the corresponding metals.

45. The process according to claim 37 wherein the bulk metal hydrotreating catalysts have a surface area of at least 50 $m^2/g$, a pore size volume of about 0.05 to about 5 ml/g, and a median diameter of at least 50 nm.

46. The process according to claim 37 wherein said effective hydrotreating conditions include temperatures of from 150 to 400° C., a hydrogen partial pressure of from 1480 to 20786 kPa (200 to 3000 psig), a space velocity of from 0.1 to 10 liquid hourly space velocity (LHSV), and a hydrogen to feed ratio of from 89 to 1780 m3/m3 (500 to 10000 scf/B).

47. The process according to claim 37 wherein the catalyst system of the present invention comprises about 5-95 vol. % of the first hydrotreating catalyst with the second hydrotreating catalyst comprising the remainder.

48. The process according to claim 37 wherein said first hydrotreating catalyst has an average pore diameter of greater than 11 nm.

49. The process according to claim 37 wherein said first hydrotreating catalyst has an average pore diameter of greater than 12 nm.

50. The process according to claim 37 wherein the catalyst system of the present invention comprises about 40-60 vol. % of the first hydrotreating catalyst with the second hydrotreating catalyst comprising the remainder.

* * * * *